(12) United States Patent
Gudewicz

(10) Patent No.: US 9,711,183 B1
(45) Date of Patent: Jul. 18, 2017

(54) DIRECT MEDIA FEED ENHANCED RECORDINGS

(71) Applicant: WiMyx Corporation, Putnam Valley, NY (US)

(72) Inventor: Jaime A. Gudewicz, Putnam Valley, NY (US)

(73) Assignee: Wi Myx Corporation, Putnam Valley, NY (US)

( * ) Notice: Subject to any disclaimer, the term of this patent is extended or adjusted under 35 U.S.C. 154(b) by 0 days.

(21) Appl. No.: 15/467,634

(22) Filed: Mar. 23, 2017

(51) Int. Cl.
| | |
|---|---|
| *H04N 5/93* | (2006.01) |
| *G11B 27/036* | (2006.01) |
| *G10L 25/48* | (2013.01) |
| *G10L 21/055* | (2013.01) |
| *H04R 1/40* | (2006.01) |
| *G10L 21/028* | (2013.01) |
| *G11B 27/10* | (2006.01) |

(52) U.S. Cl.
CPC .......... *G11B 27/036* (2013.01); *G10L 21/028* (2013.01); *G10L 21/055* (2013.01); *G10L 25/48* (2013.01); *G11B 27/10* (2013.01); *H04R 1/406* (2013.01)

(58) Field of Classification Search
USPC .................................................. 386/285, 278
See application file for complete search history.

(56) References Cited

U.S. PATENT DOCUMENTS

| | | | | | |
|---|---|---|---|---|---|
| 2007/0043766 | A1* | 2/2007 | Nicholas | ................. | H04L 67/02 |
| 2014/0115470 | A1* | 4/2014 | Meaney | ................. | H04N 9/806 |
| | | | | | 715/719 |
| 2014/0380167 | A1* | 12/2014 | Bloch | ................ | H04N 21/4307 |
| | | | | | 715/723 |

\* cited by examiner

*Primary Examiner* — Robert Chevalier
(74) *Attorney, Agent, or Firm* — Lowenstein Sandler, LLP.; Joseph G. Jones

(57) ABSTRACT

The systems and methods discussed herein relate to technology for enhancing media recordings of a live event based on a media feed corresponding to the live event. The media recordings may be media items that include audio and image data captured by a user device. The user device may be associated with a member of an audience that is experiencing the live event. The user device may generate the media item using one or more sensory input devices and may receive additional media data via a media feed. The media feed may include media data that corresponds to the live event and includes content that is similar to the media item recorded by the user device but may have been derived from a higher quality recording or include supplemental data. The media data may then be used to enhance the media item.

20 Claims, 5 Drawing Sheets

DIRECT MEDIA FEED ENHANCED RECORDINGS

TECHNICAL FIELD

Embodiments of the invention relate generally to enhancing a media recording and more specifically, to a system and method for enhancing or supplementing a media recording of an event using a digital media feed of the event.

BACKGROUND

Audience members immersed at an event often want to capture their experience to re-live the experience or share the experience with others. The audience members typically use their mobile devices to capture the experience by recording audio and video footage while in attendance. The events may be large concerts or speeches and the mobile devices may not be able to adequately capture the experience. This may result from having a poor vantage point or having less than optimal recording conditions. For example, at a concert the audience often participates during a performance, which may make it challenging to record high quality audio and video.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

The systems and methods discussed herein relate to technology for enhancing media recordings of a live event based on a media feed corresponding to the live event. The media recordings may be media items that include audio and image data captured by a user device. The user device may be associated with a member of an audience that is experiencing the live event. The user device may generate the media item using one or more sensory input devices and may receive additional media data via a media feed. The media feed may include media data that corresponds to the live event and includes content that is similar to the media item recorded by the user device but may have been derived from a higher quality recording or include supplemental data. The media data may then be used to enhance the media item.

The media item recorded by the user device may be enhanced by the user device, by a server device, other device, or a combination thereof. The enhancements may modify the audio data, image data, or other data of the media item. In one example, the media item may include media data (e.g., audio data or image data) that was captured by the user device. The quality of the media item may be less than optimal because of insufficient sensory input devices, poor vantage point, excessive background light or noise, or other challenging recording conditions. The user device may enhance the quality of the media item by modifying the media item in view of media feed. The media feed may be received over a wireless connection in the form of a media stream or one or more media downloads. The media feed may contain media data that has a higher quality then the media item recorded by the user device and the media data may originate by a source of the live event or a member of the audience. The media data of the media feed may be blended into the media item to enhance the quality of the media item. The blending may involve replacing some or all of the audio captured by the user device with audio from the media feed.

Various aspects of the above referenced methods and systems are described in details herein below by way of examples, rather than by way of limitation. The examples provided below discuss a system where the media item may be enhanced by a user device, a server device of the live event, or a combination thereof. In other examples, the enhancements to the media item may be performed by a computing device that is separate from the live event such as a server (e.g., intake server) of a social media service, content sharing service, other service, or a combination thereof. Implementations of the disclosure often reference videos for simplicity and brevity. However, the teaching of the present disclosure are applied to media items generally and can be applied to various types of content or media items, including for example, audio tracks, still images, textual documents, program instructions, etc.

Figure 1:
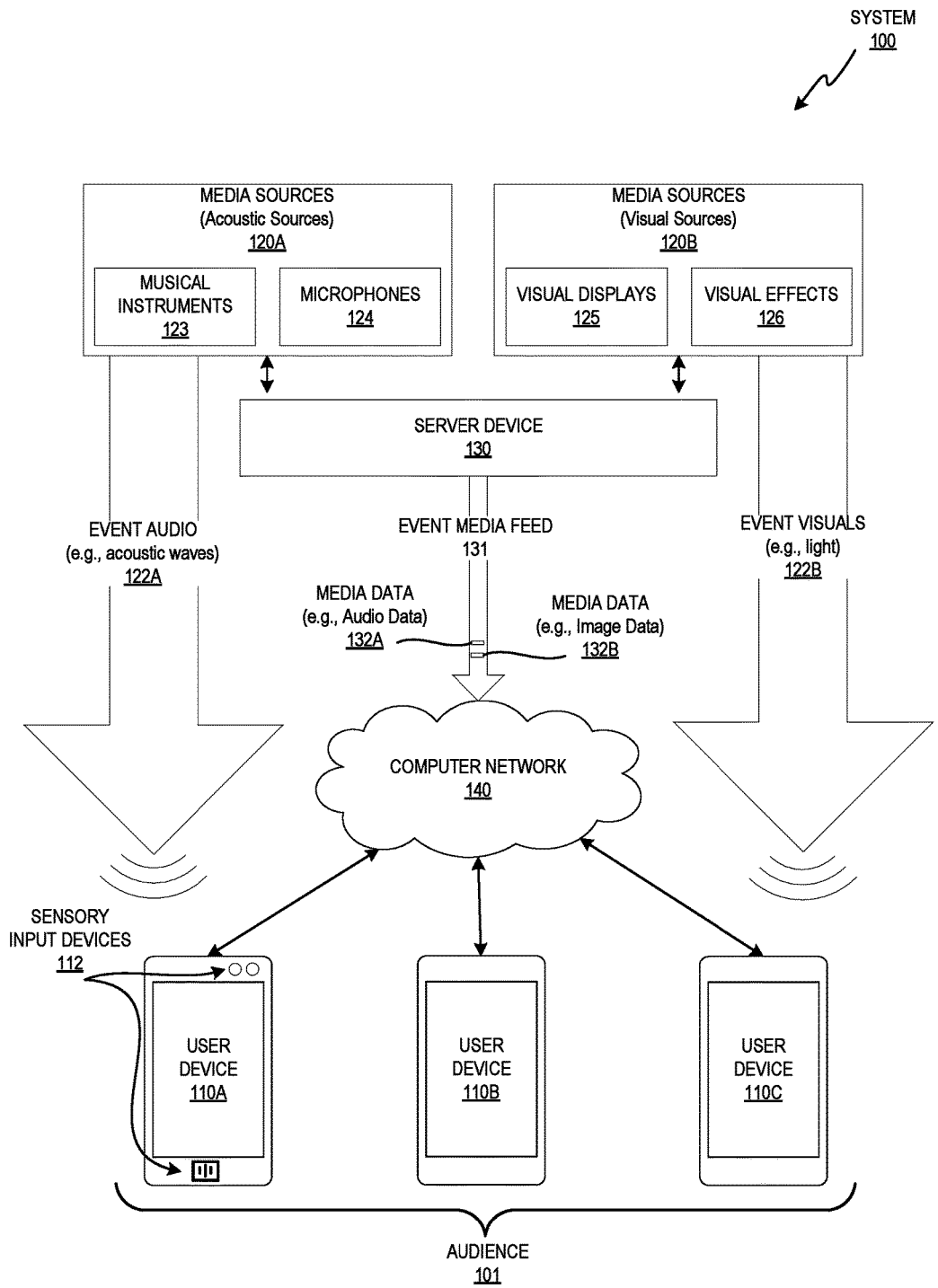
FIG. 1 is a block diagram illustrating an exemplary system architecture in which embodiments may operate.

FIG. 1 depicts illustrative elements of system 100, in accordance with an embodiment of the present disclosure. It should be noted that other arrangements of system 100 are possible, and that the implementation of a computer system utilizing embodiments of the disclosure are not necessarily limited to the specific arrangement depicted. In the example shown in FIG. 1, system 100 may depict an arrangement of devices for a performance (e.g., live performance) and may include one or more user devices 110A-C, media sources 120A and 120B, a server device 130, and a computer network 140.

The performance may be a live performance or a pre-recorder performance that is presented to one or more users. The performance may be for entertainment or informational purposes and be presented indoors or outdoors. The performance may include musical performances, visual performances, other performances, or a combination thereof. In some examples, the event may be a musical event (e.g., concert, festival, play, show, movie), a media event (e.g., speech, parade), a sporting event (e.g., a physical competition or intellectual competition), a social gathering (e.g., party, celebration,), other event, or a combination thereof. The performance may originate from or be presented at a particular geographic location or at multiple different geographic locations and may be experienced by an audience 101.

Audience 101 may include one or more audience members (e.g., users) that are in possession of user devices 110A-C. Audience 101 may be at a geographic location where the performance originates or may be spread across multiple separate geographic locations (e.g., different cities or venues). The users may experience (e.g., hear, view, feel) the performance and may want to re-live the experience or share the experience with others by capturing a portion of the performance with their user devices 110A-C.

User devices 110A-C may be any mobile computing devices that can be possessed by or associated with a user and be capable of capturing or recording an aspect of a performance. A user device may be the same or similar to a mobile phone (e.g., smart phone), a tablet computer, a computerized wrist watch (e.g., smart watch), an augmented or virtual reality headset (e.g., optical head-mounted display), a personal digital assistants (PDAs), a portable personal computer (e.g., laptop, netbook), other computing device, or a combination thereof. User devices 110A-C may include one or more computer programs in the form of software applications, operating systems, firmware, other computer instructions, or a combination thereof. The one or more computer programs may enable the user device to capture and record sensor input using one or more sensory input devices 112.

Sensory input devices 112 may include any device that is capable of capturing sensory input received by the device from the surrounding environment. The sensory input may include acoustic waves (e.g., sound waves, ultrasonic waves), electromagnetic radiation (e.g., light, radio frequency), motion, other input, or a combination thereof. Sensory input devices 112 may include one or more audio sensors (e.g., microphones), image sensors (e.g., video camera, still camera), location sensors (GPS unit, RFID unit, NFC unit, iBeacon unit), motion sensors (e.g., accelerometers), other devices, or a combination thereof.

Figure 2:
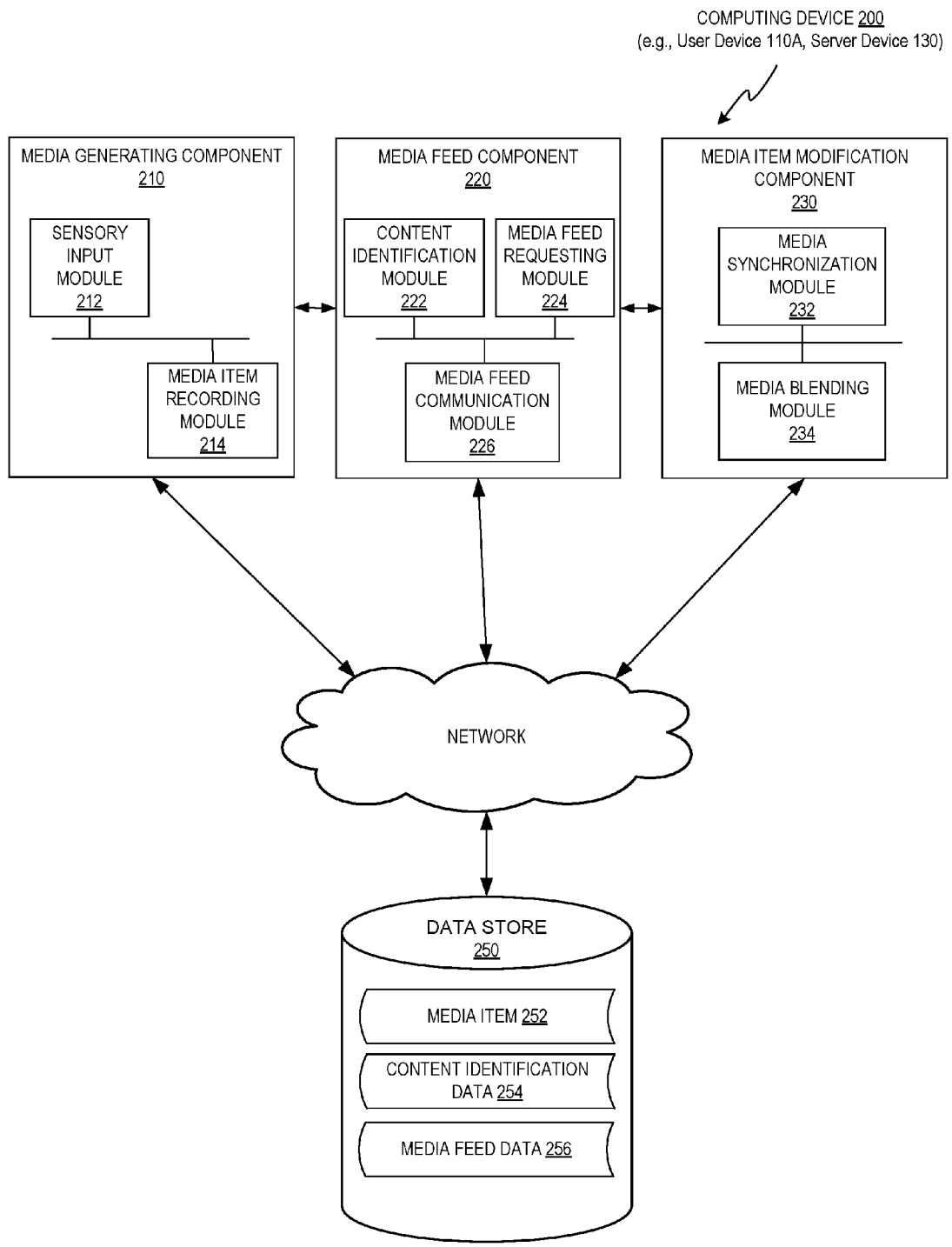
FIG. 2 is a block diagram illustrating an exemplary computing device illustrating an arrangement of components and modules for enhancing a media recording in which embodiments may operate.

Sensory input devices 112 may include multiple similar sensory input devices (e.g., duplicate sensory input devices) that work together to enhance the capturing ability of the user device. In one example, a user device may include multiple audio sensors (e.g., front, back, top, and/or bottom microphones) that are used to capture acoustic waves from different locations (e.g., vantage points) and may be used to detect the origination of the acoustic waves or to distinguish between multiple sources of acoustic waves. This may be advantageous because it may enable a user device or server to distinguish acoustic waves originating from a live performance from acoustic waves originating from the user of another member of an audience (e.g., ambient audio). In another example, a user device may include multiple other sensor devices such as multiple cameras, which may be used to form three dimensional images. As shown in FIG. 2, user device 110A may include multiple cameras and/or multiple microphones that receive sensory input from one or more media sources 120A and 120B.

Media sources 120A and 120B may be any device or combination of devices capable initiating or producing sensory output. Media sources 120A may include acoustic sources that are capable of producing acoustic waves or combining with other devices (e.g., speakers) to produce acoustic waves. Media sources 120A may include musical instruments 123, microphones 124, speakers, other devices, or a combination thereof. Media sources 120B may include visual sources that may be visually experienced by a user or user device. Media sources 120B may include visual displays 125 (e.g., monitors, projectors, TVs), visual effects 126 (e.g., light shows, pyrotechnics), performers (e.g., singers, actors, dancers), other visual source, or a combination thereof. As shown in FIG. 1, media sources 120A and 120B may emit event audio 122A and event visuals 122B.

Event audio 122A and event visuals 122B may be forms of sensory output that propagate from media sources 120A and 120B to user devices 110A-C. The sensory output may be human perceptible signals that include sound, light, or a combination thereof. The sensory output may be detected and experienced by a human being (e.g., user) and by user devices 110A-Z. The content of event audio 122A and event visuals 122B may be the same or similar to the content of event media feed 131 but the event media feed may be transmitted in different forms (e.g., digital audio stream versus sound waves).

Event media feed 131 may include the same or similar content as event media feed 131 but event media feed 131 may be provided in a computer based form that can be perceived by user devices 110A-C without being directly perceived by the human users. Event media feed 131 may include media data 132A and 132B. Media data 132A may include audio data that is the same or similar to event audio 122A or may include supplemental data such as background audio (e.g., ambient audio from audience 101). Media data 132B may include image data that is the same or similar to event visuals 122B and may include image data derived from one or more performers, stage accessories, audience members (e.g., video feed of audiance), other sources, or a combination thereof. Event media feed 131 may be transmitted to the user devices 110A-C using a computer communication technology.

The computer communication technology may include wireless communication, wired communication, or a combination thereof. The wireless communication may include radio frequency communication (e.g., WiFi, Bluetooth), infrared communication, optical communication, acoustic communication, or a combination thereof. In one example, event media feed 131 may be in the form of a media stream in which media data 132A and/or 132B are communicated using a media streaming technology or protocol. The media streaming technology may be the same or similar to Dynamic Adaptive Streaming over HTTP (DASH), Adaptive Bitrate Streaming (ABS), Real-time Streaming Protocol (RTSP), Real-time Transport/Control Protocol (RTP/RTCP), other proprietary or standardized protocol, or a combination thereof. In another example, event media feed 131 may be in the form of one or more file transfers (e.g., downloads or offloads) in which media data 132A and/or 132B are communicated using a file transfer technology or protocol (e.g., Hyper Text Transfer Protocol (HTTP), File Transfer Protocol (FTP), BitTorrent). In other examples, event media feed 131 may be transmitted from server device 130 to user devices 110A-C using one or more other computer communication protocols which may include client-server protocols, peer-to-peer protocols, broadcast/multicast protocols, or a combination thereof.

Server device 130 may include one or more computing devices and may be configured to receive analog or digital event information from media sources 120A and 120B and to include the event information within event media feed 131. The computing devices may include one or more desktops, laptops, mixers, other devices, or a combination thereof. Server device 130 may include one or more computer programs in the form of software applications, operating systems, firmware, other computer instructions or a combination thereof. In one example, server device 130 may be located at the location of the performance (e.g., back stage at a concert). In another example, server device 130 may be located at a location that is remote from the performance such as at a data center (e.g., public or private cloud service).

Computer network 140 may be a private network (e.g., a local area network (LAN), a public network (e.g., the internet), a wide area network (WAN)), other computer network or a combination thereof. In one example, computer network 140 may include a wired or a wireless infrastructure, which may be provided by one or more communications systems, such as a wireless fidelity (WiFi) access point (e.g., hotspot) connected with the computer network 140 and/or a wireless carrier system that can be implemented using various data processing equipment, communication towers, etc.

FIG. 2 depicts a block diagram of an exemplary system 200 for enhancing media items using a media feed, in accordance with aspects of the disclosure. In one example, system 200 may be the same or similar to user device 110A or server device 130 of FIG. 1. In another example, the components and modules of system 200 may be executed on a combination of user device 110A and server device 130. For example, some of the modules may execute on a user device and other modules may execute on the server device 130 and they may communicate with one another in order to enhance the media recording (e.g., media item). As illustrated, system 200 may include a media generating component 210, a media feed component 220, a media item modification component 230, and a data store 250. More or less components may be included without loss of generality. For example, two or more of the components or modules may be combined into a single component or module or one of the components or modules may be divided into two or more components or modules.

Media generating component 210 may enable the system to capture sensory input and generate a media item 252. Media item 252 may be a user generated recording that includes audio data, image data, or a combination thereof. Media item 252 may be any data structure, such as a file system object (e.g., file) or database object stored in data store 250. In one example, media item 252 may be a video recording generated by the user device in response to capturing sensory input using a camera and/or microphone that are integrated into the user device. In another example, media item 252 may be a video generated by the user device using video editing software and incorporating aspects of a performance. In the example shown, media generating component 210 may include a sensory input module 212 and a media recording module 214.

Sensory input module 212 may gather sensory input generated from one or more sensory input devices. The sensory input may include audio data, image data, motion data, location data, other data, or a combination thereof. As discussed above, there may be multiple similar sensory input devices (e.g., multiple microphones) that capture input from different vantage points. Sensory input module 212 may analyze and compare input from the similar sensory input devices to determine additional information about the sensory input. For example, sensory input module 212 may compare or contrast sensory input gathered from the separate similar sensory input devices. This may enable sensory input module 212 to identify or form stereo data. For example, when multiple microphones or cameras are used the sensory input module 212 may identify stereophonic audio (e.g., surround sound) or stereoscopic images (e.g., three dimensional video). The comparison of sensory input from the different input devices may enable the sensory input module 212 to distinguish between sources of the sensory input. This may be advantageous for distinguishing between multiple audio sources, such as between audio emitted by media sources of a performance and audio emitted by an audience of the performance.

Media recording module 214 may access information produced by sensory input module 212 and may store the information in data store 250 as media item 252. The information may be processed before, during, or after the media item is created. The processing may include data compression (e.g., lossless compression, lossy compression), data filtering (e.g., noise reduction), other data modification technique, or a combination thereof. Media recording module 214 may store media item 252 in any standard or proprietary format (e.g., video container format, image container format, audio container format) which may be the same or similar to MPEG (e.g., .MP2, .MP4), Quick Time (e.g., .MOV), Windows Media Video (.WMV), other format, or a combination thereof.

Media feed component 220 may enable the computing device to initiate a media feed that contains media feed data 256 for enhancing the media item. Media feed component 220 may include a content identification module 222, a media feed requesting module 224, and a media feed communication module 226.

Content identification module 222 may analyze media item 252 and data associated with the media item 252 to determine content identification data 254. Content identification data 254 may include information that indicates the content of media item 252. Content identification data 254 may be determined by analyzing or extracting data derived from the media item, the sensory input devices, other information, or a combination thereof. Content identification module 222 may include electronic ticket information, timing information, geographic information, other information, or a combination thereof. The electronic ticket information may include performer information (e.g., artist, actor, athlete), event program information (e.g., itinerary), other information or a combination thereof.

Content identification module 222 may access the content identification data 254 or derive the data from media item 252. In one example, the content identification data (e.g., timing information) may be included within the media data of the media item (e.g., audio data). For example, there may be an embedded time signal that indicates one or more points in time when the sensory input was generated, transmitted, or received. In another example, the timing information may also or alternatively be included as metadata for the media item that is separate from the audio data, such as file metadata (e.g., time stamp) indicating the beginning, end, or other instant or duration of time when the information was recorded or when the sensory input device sensed the event audio (e.g., sound waves). In either example, the content identification data (e.g., timing information) may be used to correlate the portion of the performance that is recorded with a portion of the performance that may be requested by media feed requesting module 224.

Media feed requesting module 224 may request media data for a portion of the performance. The media data being requested may be the same or similar to the media data that was provided by the media sources during a performance (e.g., live event audio, live event visuals) but may be received via a digital media feed as opposed to being received as sound waves and light. As a result, the media data within the media feed (e.g., media feed data 256) may have a higher quality and include information that was not perceptible or available to the user device at the instant media item 252 was captured and recorded. In one example, media feed requesting module 224 may execute on a user device and may transmit the request to a server or other computing device that has access to the requested media data. In another example, media feed requesting module 224 may execute on a server (e.g., event venue or cloud based server) and may transmit a request to a data store to retrieve the media data.

Media feed communication module 226 may handle the initiation of one or more media feeds. The media feeds may include one or more broadcasts, multicasts, point-to-point connections, peer-to-peer connections, other connections, or a combination thereof. A media feed may be initiated before, during, or after the request has been transmitted. In one example, the media feed may be initiated concurrently or in response to the request for the media data. In another example, the media feed may be initiated before the request is generated such as when a user enters or registers at an event or when the user initiates the capture of a media item (e.g., user input activating camera).

Media item modification component 230 may enable the modification of the media item recorded by the user device. The modification may enhance the media item using information that is not already present (e.g., absent from) the media item. Media item modification component 230 may include a media synchronization module 232 and a media blending module 234.

Media synchronization module 232 may synchronize the media data within the captured media item with the media data received via the media feed. Media synchronization module 232 may use any method to align corresponding portions of media data. In one example, media synchronization module 232 may use timing information associated (e.g., linked or embedded) with the respective media data to align corresponding portions of media data of the media item and media feed. In another example, media synchronization module 232 may analyze media data of the media feed to identify one or more unique or distinguishing marks (e.g., audio fingerprints) and then search for those unique or distinguishing marks in one or more portions of the media item (or vice versa). In other examples, media synchronization module 232 may use any of the information discussed above in regards to content identification module 222, such as electronic ticket information, timing information, geographic information, other information, or a combination thereof.

Media blending module 234 may modify the media item to enhance the content of the media item. Media blending module 234 may enhance the media item by incorporating some or all of the media data from the media feed into the media item. The blending may occur at different percentages that vary from 0-100%, wherein blending 100% may fully replace the audio or image data of the media item with the media data from the media feed and 0% may not replace any of the audio data of the media item. In the latter case, supplemental information (e.g., metadata) may be added to the media item. The supplemental information may include artist information, track information, album information, location information, advertisement information (e.g., ads), other data, or a combination thereof. In another example, media blending module 234 may enhance the media item by modifying the media item in view of the media data from the media feed.

Figure 3:
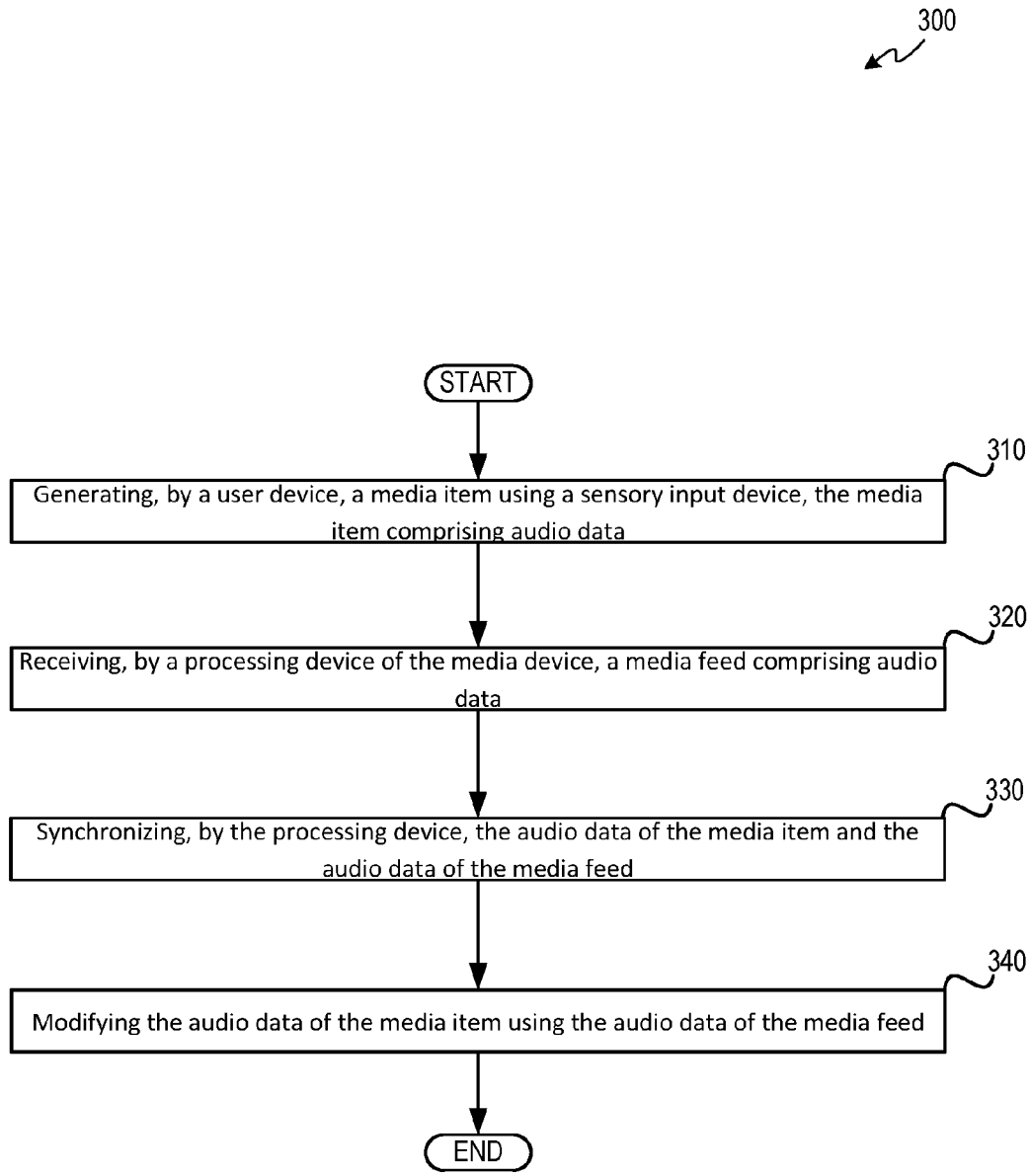
FIG. 3 illustrates a process flow for enhancing a media item using a media feed, in which embodiments may operate.
Figure 4:
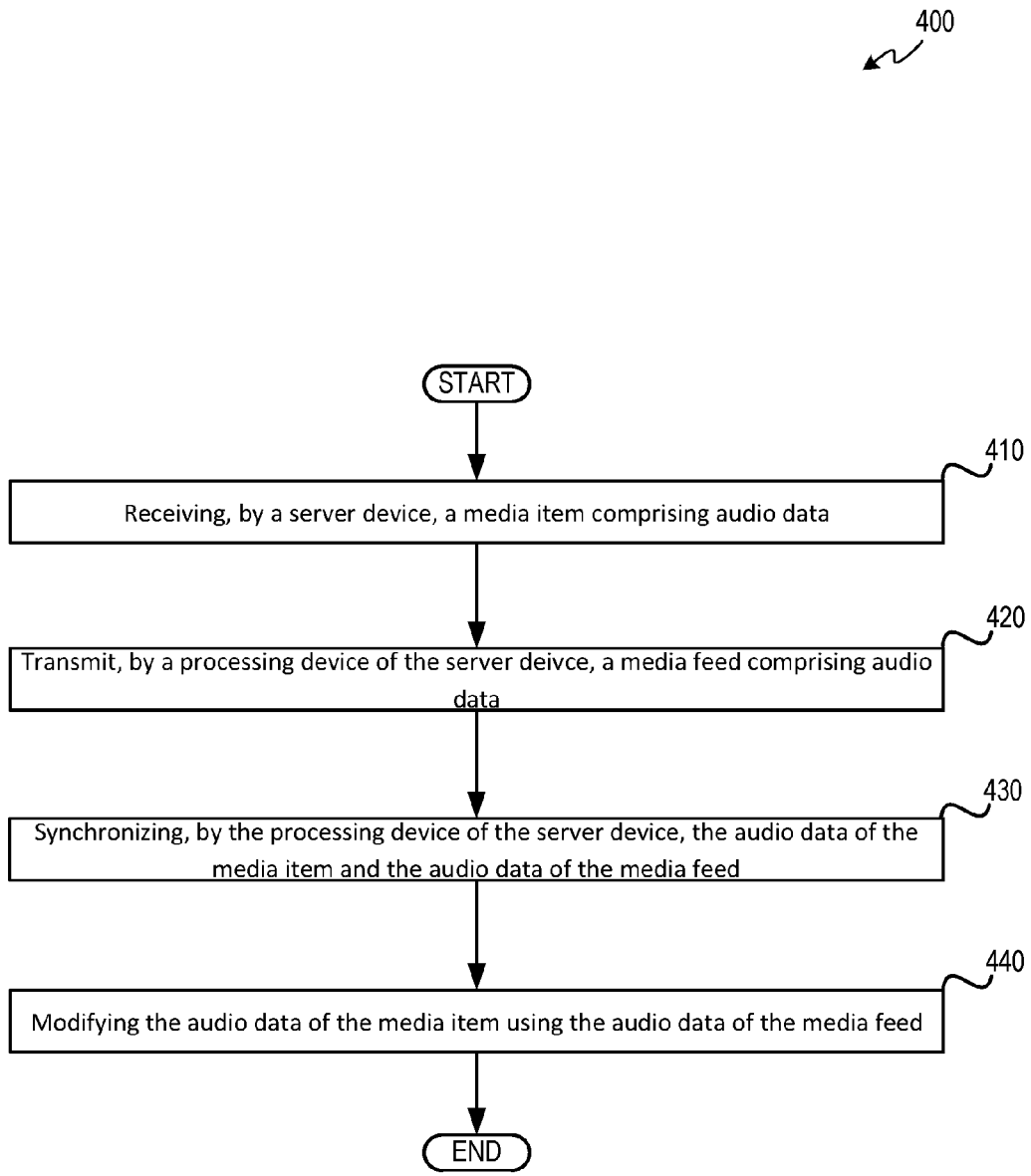
FIG. 4 illustrates another process flow for enhancing a media item using a media feed, in which embodiments may operate.

FIGS. 3 and 4 depict flow diagrams for illustrative examples of methods 300 and 400 for enhancing media items using media data from a digital media feed. Method 300 illustrates an example process flow from the perspective of a user device and method 400 is an example method from the perspective of a server device (e.g., venue or cloud based server). Methods 300 and 400 may be performed by processing devices that comprise hardware (e.g., circuitry, dedicated logic, programmable logic, microcode, etc.), software (such as is run on a general-purpose computer system or a dedicated machine), or a combination of both. Methods 300 and 400 and each of their individual functions, routines, subroutines, or operations may be performed by one or more processors of the computer device executing the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by computing device(s) as shown in FIGS. 1 and 2.

Referring to FIG. 3, method 300 may be performed by processing devices of a user device or a combination of a user device and one or more server devices and may begin at block 302. At block 302, a processing device of a user device may generate a media item using one or more sensory input devices. The media item may include audio data, image data, motion picture data (e.g., video data), or a combination thereof. In one example, generating the media item using the sensory input device may involve capturing video footage with a camera of a user device and capturing, by a plurality of microphones of the user device, audio input from a plurality of sources at a live event. The plurality of sources may include a first source, which may be live performance (e.g., concert performance) and a second source, which may be an audience of the live performance. The processing device may include logic for distinguishing between the plurality of sources at the live event.

At block 304, the processing device may receive a media feed comprising audio data. The audio data of the media item and the audio data of the media feed may be derived from a source of a live event and the live event may be at least one of a musical performance or a visual performance. In one example, receiving the media feed may involve receiving the audio data of the media feed in the form of a media stream or a media download over a wireless connection from a source of the live event. The processing device may determine source information for the audio data of the media item and request the media feed. The source information may include at least one of time information, location information, artist information, or song information associated with the recorded media item. The processing device may transmit the request for the media feed that includes the source information and the request may initiate the media feed with the requested media data.

At block 306, the processing device may synchronize the audio data of the media item and the audio data of the media feed. The synchronization may involve using any method to align corresponding portions of media data. In one example, the synchronization may use timing information associated with (e.g., linked to or embedded in) the respective media data to align corresponding portions of media data from the media item and the media feed. In another example, the synchronization may analyze media data of the media feed to identify one or more unique or distinguishing marks and then search for those unique or distinguishing marks in one or more portions of the media item, or vice versa. In other examples, the synchronization may use any of the information discussed above in regards to content identification module 222, such as electronic ticket information, timing information, geographic information, other information, or a combination thereof.

At block 308, the processing device may modify the audio data of the media item using the audio data of the media feed. The audio data of the media feed may include data that has a higher quality then the media item recorded by the user device. The modification of the media item audio data may involve blending the audio data of the media feed with the audio data of the media item. In one example, the modification of the media item audio data may involve replacing all or a portion of the audio data corresponding to the live performance without replacing audio data corresponding to the audience of the live performance.

The media feed or an additional media feed may include audio data that is derived from the audience, as opposed to the primary performance, which may be referred to as ambient audio. In one example, the ambient audio may be captured by a microphone associated with the live performance, such as a stage microphone or a background microphone. In another example, the ambient audio may be captured by one or more microphones of the user devices in the audience.

The ambient audio may be local ambient audio, aggregated ambient audio, other audio, or a combination thereof. Local ambient audio may be captured by microphones of the user device that captured and recorded the media item that is being modified. Aggregated ambient audio may be captured by multiple user devices within the audience of the live performance and the multiple user devices may include or exclude the device that captured the media item being modified. In either example, the processing device may modify the audio data of the media item using the ambient audio data. Responsive to completing the operations described herein above with references to block 308, the method may terminate.

Referring to FIG. 4, method 400 may be performed by processing devices of a server device or a combination of a server device and a user device and may begin at block 402. At block 402, the processing device of a server may receive a media item that includes audio data, image data, motion picture data (e.g., video data), or a combination thereof. The media item may have been generated by a user device that includes one or more sensory input devices. In one example, the media item may be generated by capturing video footage with a camera of a user device and capturing, by a plurality of microphones of the user device, audio input from a plurality of sources at a live event. The plurality of sources may include a first source, which may be live performance (e.g., concert performance) and a second source, which may be an audience of the live performance. The processing device may include logic for distinguishing between the plurality of sources at the live event.

At block 404, the processing device may transmit a media feed comprising audio data. The audio data of the media item and the audio data of the media feed may be derived from a source of a live event and the live event may be at least one of a musical performance or a visual performance. In one example, receiving the media feed may involve receiving the audio data of the media feed in the form of a media stream or a media download over a wireless connection from a source of the live event. The processing device may determine source information for the audio data of the media item and request the media feed. The source information may include at least one of time information, location information, artist information, or song information associated with the recorded media item. The processing device may transmit the request for the media feed that includes the source information and the request may initiate the media feed with the requested media data.

At block 406, the processing device may synchronize the audio data of the media item and the audio data of the media feed. The synchronization may involve using any method to align corresponding portions of media data. In one example, synchronization may use timing information associated with (e.g., linked to or embedded in) the respective media data to align corresponding portions of media data of the media item and media feed. In another example, synchronization may analyze media data of the media feed to identify one or more unique or distinguishing marks and then search for those unique or distinguishing marks in one or more portions of the media item (or vice versa). In other examples, media synchronization module 232 may use any of the information discussed above in regards to content identification module 222, such as electronic ticket information, timing information, geographic information, other information, or a combination thereof.

At block 408, the processing device may modify the audio data of the media item using the audio data of the media feed. The audio data of the media feed may include data that has a higher quality then the media item recorded by the user device. The modification of the media item audio data may involve blending the audio data of the media feed with the audio data of the media item. In one example, the modification of the media item audio data may involve replacing all or a portion of the audio data corresponding to the live performance without replacing audio data corresponding to the audience of the live performance.

The media feed or an additional media feed may include audio data that is derived from the audience (e.g., auxiliary source), as opposed to the primary performance), which may be referred to as ambient audio. In one example, the ambient audio may be captured by a microphone associated with the live performance (e.g., stage microphone, background microphone). In another example, the ambient audio may be captured by one or more microphones of the user devices within the audience. The ambient audio may be local ambient audio, aggregated ambient audio, other audio, or a combination thereof. Responsive to completing the operations described herein above with references to block 408, the method may terminate.

Figure 5:
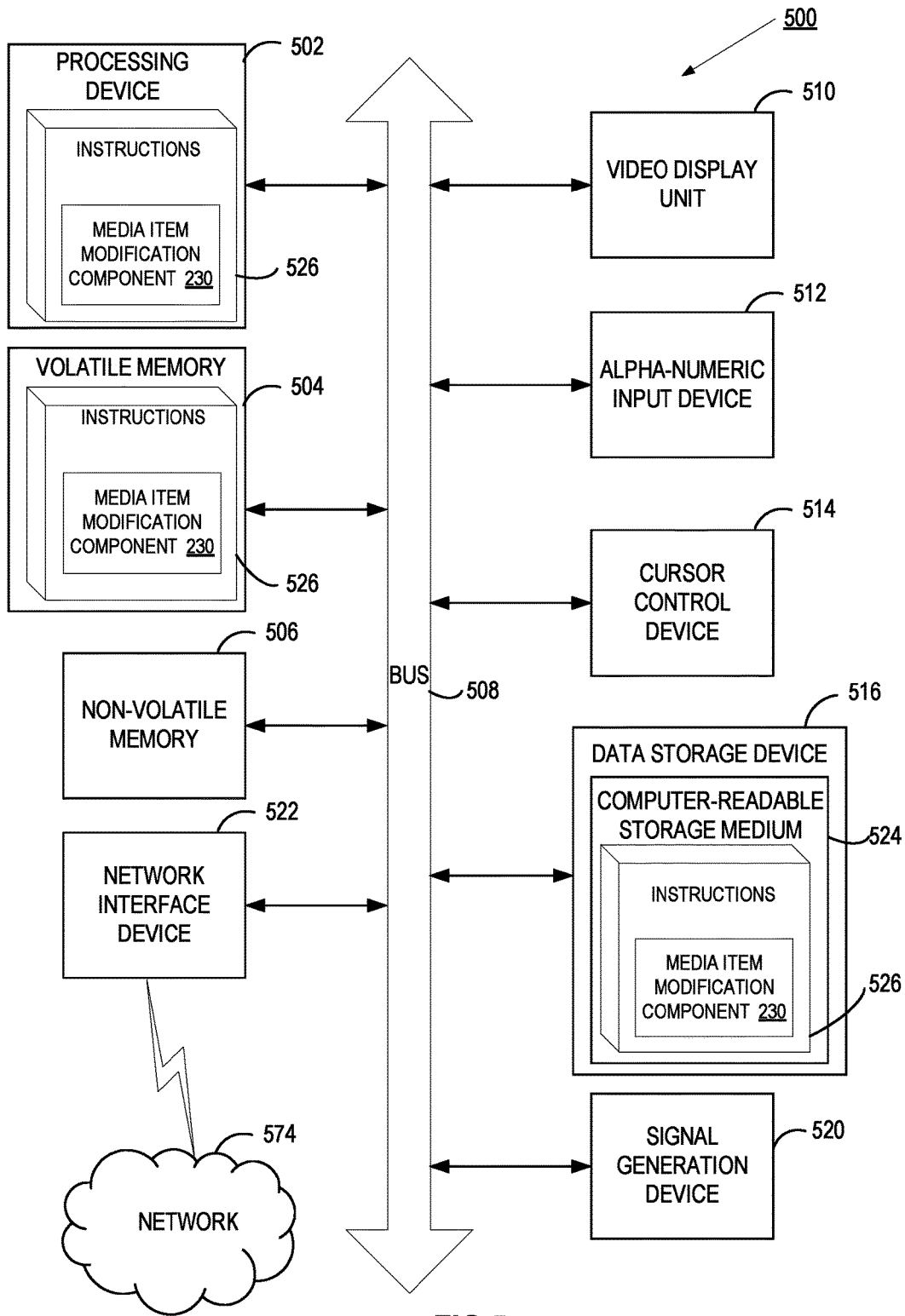
FIG. 5 is a block diagram illustrating an exemplary system in which embodiments of the present invention may operate.

FIG. 5 depicts a block diagram of a computer system operating in accordance with one or more aspects of the present disclosure. In various illustrative examples, computer system 500 may correspond to system 100 of FIG. 1 or computing device 200 of FIG. 2. The computer system may be included at an event venue or within a data center (e.g., cloud service). In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing methods 300 or 500 and for encoding .media item modification component 230 and modules illustrated in FIGS. 1 and 2.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claim is:

1. A method comprising:
    generating a media item using a sensory input device, the media item comprising audio data;
    receiving, by a processing device, a media feed comprising audio data;
    synchronizing, by the processing device, the audio data of the media item and the audio data of the media feed; and
    modifying the audio data of the media item using the audio data of the media feed.

2. The method of claim 1, wherein generating the media item using the sensory input device comprises capturing video footage with a camera of a user device.

3. The method of claim 1, wherein the audio data of the media item and the audio data of the media feed are derived from a source of a live event, wherein the live event is at least one of a musical performance or a visual performance.

4. The method of claim 3, wherein receiving the media feed comprises receiving the audio data of the media feed in the form of a media stream or a media download over a wireless connection from a source of the live event.

5. The method of claim 1, further comprising:
    determining source information for the audio data of the media item, wherein the source information comprises at least one of time information, location information, artist information, or song information; and
    transmitting a request for the media feed, wherein the request comprises the source information.

6. The method of claim 1, wherein modifying the audio data of the media item comprises blending the audio data of the media feed with the audio data of the media item.

7. The method of claim 1, further comprising:
capturing, by a plurality of microphones of a user device, audio input from a plurality of sources at a live event; and
distinguishing between the plurality of sources at the live event, wherein a first source is a live performance and a second source is an audience of the live performance.

8. The method of claim 7, wherein modifying the audio data of the media item comprises replacing audio data corresponding to the live performance without replacing audio data corresponding to the audience of the live performance.

9. The method of claim 1, further comprising:
receiving a media feed comprising ambient audio that corresponds to an audience of a live performance; and
modifying the audio data of the media item using the ambient audio data.

10. The method of claim 9, wherein the ambient audio is captured by a microphone associated with the live performance.

11. The method of claim 9, wherein the ambient audio is aggregated ambient audio captured by microphones of a plurality of user devices within the audience of the live performance.

12. A system comprising:
a memory; and
a processing device communicatively coupled to the memory, the processing device configured to:
generate a media item using a sensory input device, the media item comprising audio data;
receive a media feed comprising audio data;
synchronize the audio data of the media item and the audio data of the media feed; and
modify the audio data of the media item using the audio data of the media feed.

13. The method of claim 12, further comprising:
capturing, by a plurality of microphones of a user device, audio input from a plurality of sources at a live event; and
distinguishing between the plurality of sources at the live event, wherein a first source is a live performance and a second source is an audience of the live performance.

14. The system of claim 12, wherein the processing device is further to:
receive a media feed comprising ambient audio that corresponds to an audience of a live performance; and
modify the audio data of the media item using the ambient audio data.

15. The system of claim 14, wherein the ambient audio is captured by a microphone associated with the live performance.

16. The system of claim 14, wherein the ambient audio is aggregated ambient audio captured by microphones of a plurality of user devices within the audience of the live performance.

17. A non-transitory computer-readable storage medium programmed to include instructions that, when executed by a processing device, cause the processing device to:
generate a media item using a sensory input device, the media item comprising audio data;
receive, by a processing device, a media feed comprising audio data;
synchrone, by the processing device, the audio data of the media item and the audio data of the media feed; and
modifying the audio data of the media item using the audio data of the media feed.

18. The non-transitory computer-readable storage medium of claim 17, wherein the processing device is further to:
receive a media feed comprising ambient audio that corresponds to an audience of a live performance; and
modify the audio data of the media item using the ambient audio data.

19. The non-transitory computer-readable storage medium of claim 18, wherein the ambient audio is captured by a microphone associated with the live performance.

20. The non-transitory computer-readable storage medium of claim 18, wherein the ambient audio is aggregated ambient audio captured by microphones of a plurality of user devices within the audience of the live performance.

* * * * *